United States Patent [19]

Mims et al.

[11] Patent Number: 4,832,113
[45] Date of Patent: May 23, 1989

[54] SURVIVABLE PULSE POWER SPACE RADIATOR

[75] Inventors: James Mims; David Buden; Kenneth Williams, all of Albuquerque, N. Mex.

[73] Assignee: The United States of America as represented by the United States Department of Energy, Washington, D.C.

[21] Appl. No.: 167,203

[22] Filed: Mar. 11, 1988

[51] Int. Cl.⁴ .......................... B64G 1/50; B64G 1/56; B64G 1/44
[52] U.S. Cl. .......................................... 165/1; 165/41; 165/86; 244/158 R; 244/163
[58] Field of Search .................... 244/158 R, 163, 173; 165/41, 86, 1

[56] References Cited

U.S. PATENT DOCUMENTS

| | | | |
|---|---|---|---|
| 3,152,774 | 10/1964 | Wyatt | 244/1 |
| 3,326,497 | 6/1967 | Michelson | 244/173 |
| 3,347,309 | 10/1967 | Webb | 244/163 |
| 3,450,195 | 6/1969 | Schnacke | 165/47 |
| 3,490,718 | 1/1970 | Vary | 244/163 |
| 3,903,699 | 9/1975 | Davis | 244/173 |
| 4,161,212 | 7/1979 | Hightower | 244/163 |
| 4,324,375 | 4/1982 | O'Neill | 244/163 |
| 4,630,791 | 12/1986 | Chapman | 244/173 |
| 4,666,107 | 5/1987 | Berry | 244/158 R |
| 4,706,740 | 11/1987 | Mahefkey | 165/41 |
| 4,727,932 | 3/1988 | Mahefsky | 165/41 |
| 4,738,304 | 4/1988 | Chalmers et al. | 165/41 |

OTHER PUBLICATIONS

Heat Rejection Systems Development Programs, Brochure Vought Systems Division of LTV Corp., Dallas, Tex. (no date).

Primary Examiner—Albert W. Davis, Jr.
Assistant Examiner—John K. Ford
Attorney, Agent, or Firm—L. E. Carnahan; Roger S. Gaither; William R. Moser

[57] ABSTRACT

A thermal radiator system is described for use on an outer space vehicle, which must survive a long period of nonuse and then radiate large amounts of heat for a limited period of time. The radiator includes groups of radiator panels that are pivotally connected in tandem, so that they can be moved to deployed configuration wherein the panels lie largely coplanar, and to a stowed configuration wherein the panels lie in a stack to resist micrometeorite damage. The panels are mounted on a boom which separates a hot power source from a payload. While the panels are stowed, warm fluid passes through their arteries to keep them warm enough to maintain the coolant in a liquid state and avoid embrittlement of material. The panels can be stored in a largely cylindrical shell, with panels progressively further from the boom being of progressively shorter length.

4 Claims, 2 Drawing Sheets

U.S. Patent  May 23, 1989  Sheet 1 of 2  4,832,113
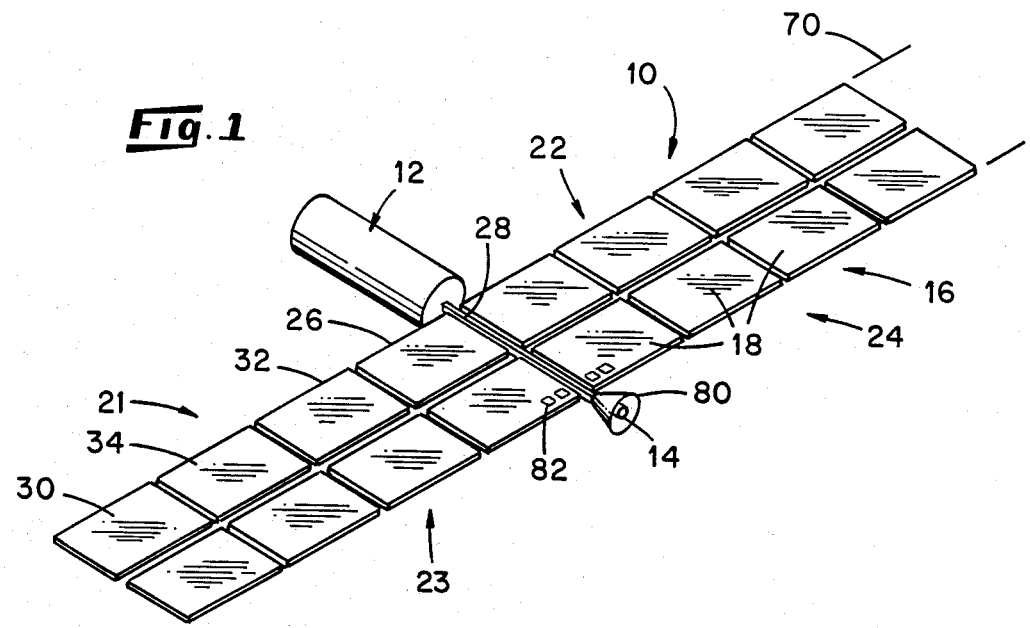
Fig. 1
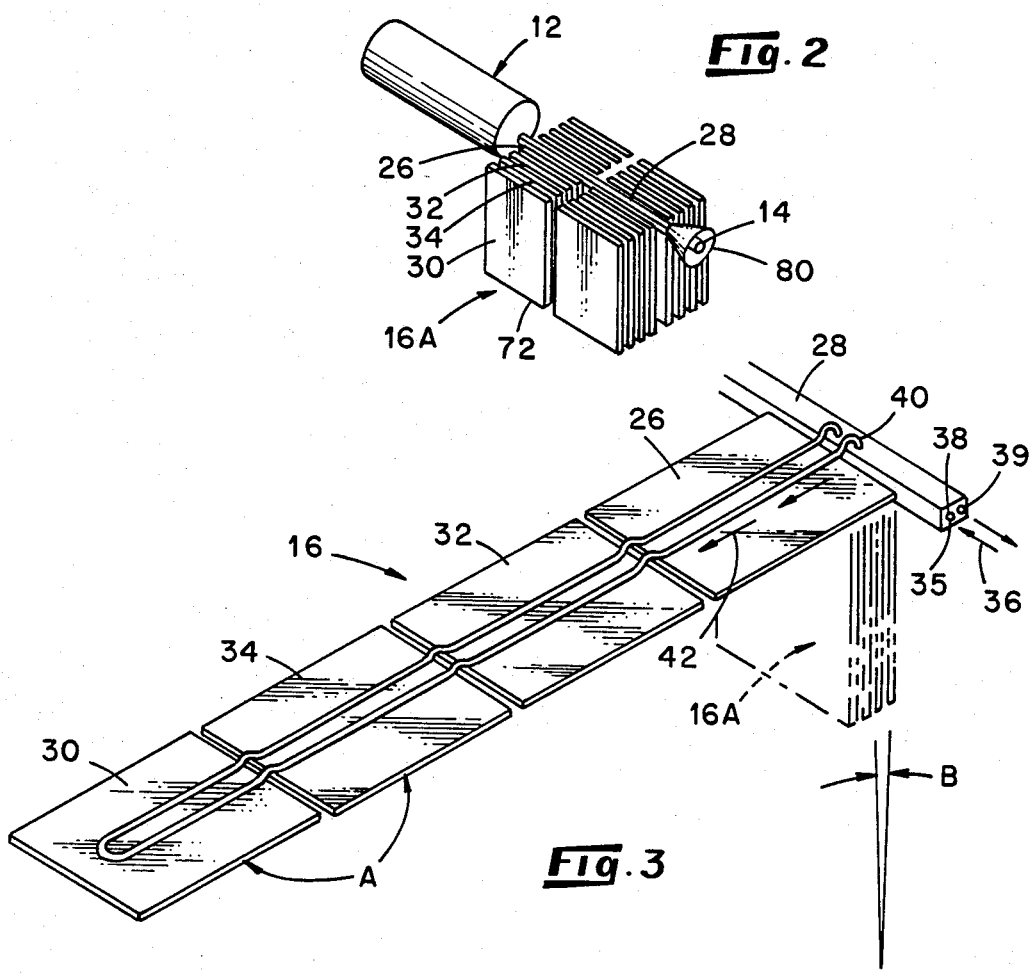
Fig. 2
Fig. 3

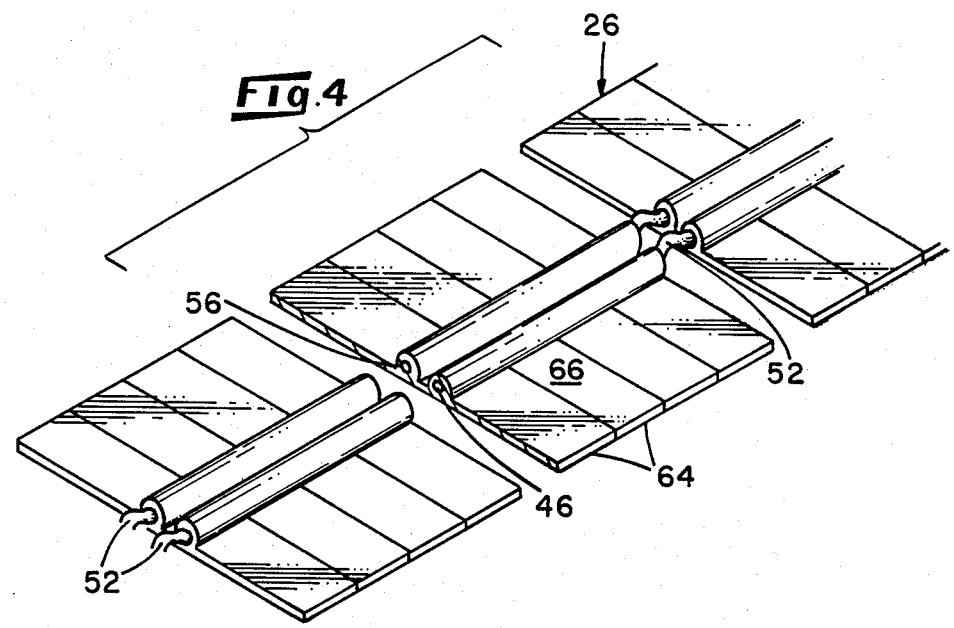
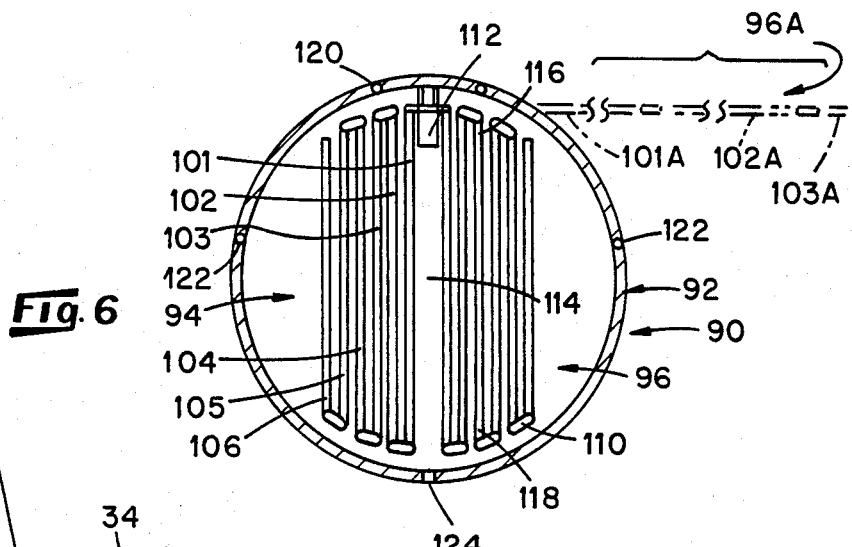
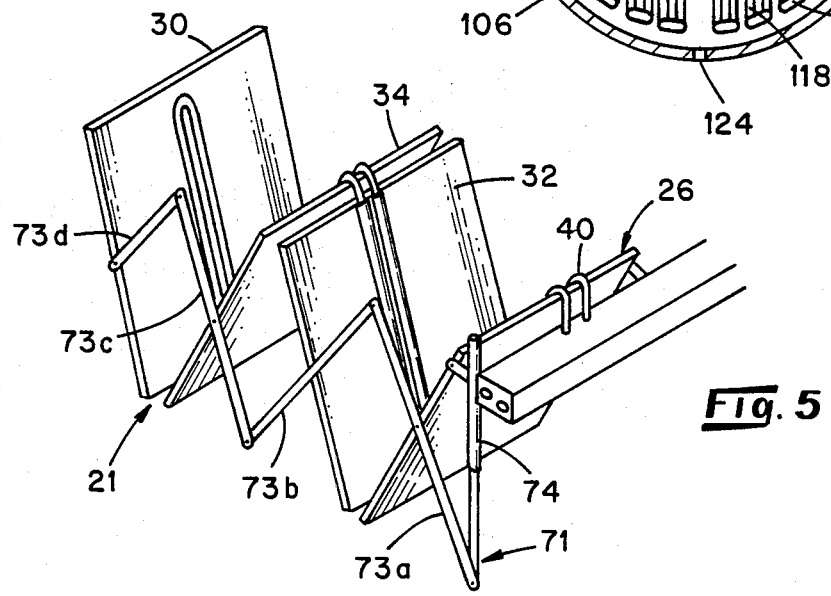

SURVIVABLE PULSE POWER SPACE RADIATOR

BACKGROUND OF THE INVENTION

The Government has rights in this invention pursuant to Contract No. DE-AC03-85SF16017 awarded by the U.S. Department of Energy.

Strategic defense platforms can be formed by orbiting space vehicles having thermal power plants, such as nuclear reactors, for supplying large amounts of power to a payload when required. However, the power plant lies substantially dormant, or operating at a low level, for long periods of time. Studies have shown that power levels such as tens to hundreds of megawatts for 200 to 2000 seconds may be required. The power plant outlet temperature may be on the order of 2000° to 2500° K. and a working fluid for drawing away the heat may have to operate at a temperature of about 1000° to 1300° K. The heat drawn by the working fluid can be radiated by panels which include conduits that carry the hot working fluid and multiple heat pipes that carry the heat to large areas from which the heat is radiated into outer space. U.S. Pat. No. 3,450,195 describes an arrangement of this type.

Where the radiator system is to lie substantially dormant for long periods of time, such as many years, problems can occur in assuring reliable operation when the system is suddenly needed. One problem is a possibility of damage to the panels from micrometeorites. Although the pipes carrying working fluid can be somewhat shielded by the heat pipes, additional shielding is required to minimize the amount of damage to the pipes that carry the working fluid and to the large area radiation device. Another problem is that suitable working fluids which may have to operate at temperatures of about 1000° to 1300° K., tend to solidify at the low temperatures encountered in an outer space environment. If it were required to melt a solidified working fluid, this can cause long delays in the startup of the system. Another problem is making the heat rejection system very light weight. The transportation cost of deploying systems into space makes this extremely important. A thermal outer space radiator which could survive long periods of substantial nonuse, while being reliably ready for rapid high power use, would be of considerable value.

SUMMARY OF THE INVENTION

It is an object of this invention to provide a heat radiator for use on outer space vehicles, which operates with high reliability.

A further object is to provide a heat radiator which can be stored in a configuration wherein it resists damage from micrometeorites.

A still further object is to provide a heat radiator which can be compactly stored.

In accordance with one embodiment of the present invention, a thermal radiator system is provided for use in an outer space vehicle to radiate heat, which can lie dormant for a long period of time and then be rapidly and reliably operated to radiate large amounts of heat. The radiator system includes a plurality of radiator panels, each having conduits or arteries for carrying a hot fluid, and each forming a large area radiator surface thermally coupled to the arteries. The system also includes means for moving the panels between a deployed configuration wherein they lie largely coplanar to radiate heat, and a stowed configuration wherein they lie in a stack. In the stacked configuration the outer panels protect the inner panels from micrometeorite damage, and also enable a smaller amount of heat to maintain the panels warm enough to keep the working fluid liquid.

The radiator panels can be joined in tandem, by flexible flush joints and an extendable mechanical mounting device. The radiator can be mounted on a boom that separates a payload from a nuclear reactor. The system can be operated so that the reactor generates sufficient heat to maintain the working fluid liquid during the long period when the panel system is in its stowed configuration.

The panels can be held in a stowed configuration in a largely cylindrical shell. The arrangement can include long panels near the axis of the shell, and panels of progressively smaller length progressively further from the axis.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of an outer space vehicle with a radiator system constructed in accordance with the present invention, shown in a deployed configuration.

FIG. 2 is a view similar to FIG. 1, but showing the radiator system in a stowed configuration.

FIG. 3 is a partial perspective view of the radiator system of FIG. 1.

FIG. 4 is a more detailed view of the radiator system of FIG. 3.

FIG. 5 is a partially deployed view of the radiator system of FIG. 1.

FIG. 6 is a sectional view of a radiator system constructed in accordance with another embodiment of the invention, shown in a stowed configuration.

DESCRIPTION OF THE PREFERRED EMBODIMENTS

FIG. 1 illustrates an outer space vehicle 10 which includes a payload 12 such as a strategic defense platform which may lie substantially dormant for many years, but which may be rapidly activated to operate at a high power level. The vehicle also includes a power source such as a nuclear reactor 14 which can lie substantially dormant for many years and then suddenly supply large amounts of electricity to the payload, the electricity being generated by the generation of considerable heat converted by turboalternators or other electric conversion devices. The vehicle also includes a pulse power radiator system 16 which can lie substantially dormant for many years and then be used to radiate large amounts of heat into outer space. The radiator system 16 includes radiator panels 18 which, in the drawings, are shown divided into four groups 21–24, each group including four panels. Panels of each group such as 21 include an innermost panel 26 mounted on a boom 28 that connects the payload 12 and power source 14, an outermost panel 30 lying furthest from the boom 28, and a pair of intermediate panels 32, 34.

FIG. 3 illustrates some details of the panel group 21 and the boom 28 on which it is mounted. The power source includes a pump (not shown) which pumps fluid 35 in the direction of the arrow 36 through an output boom conduit 38 with cooled fluid returned through an input boom conduit 39. Some of the fluid passes through a joint 40 to move in the direction of arrows 42 thorugh pipes, referred to herein as arteries, through the panel group. As shown in FIG. 4, in most of the panels the incoming fluid passes through a conduit 46. The fluid then passes through a flexible joint 52 to a next panel. After circulating through the outermost panel 30 (FIG. 3) the fluid returns, flowing through conduit 56 (FIG. 4). The fluid then passes through another flexible joint 52 to a conduit of an adjacent panel 26. Each panel also includes several heat pipes 64, which receive heat from the conduits 46, 56 and distribute the heat over a large surface area 66 of the heat pipe, to radiate the heat into outer space. A variety of constructions of heat pipes are available, such as a type shown in U.S. Pat. No. 3,450,195.

Each group of panels 21-24 of the radiator system 16 can be reconfigured from the deployed configuration shown in FIGS. 1 and 3 to a stowed configuration. In the deployed configuration of FIG. 1 the panels of each group of panels lie at an angle A of at least 90° from the stored configuration, the panels in FIG. 1 lying substantially coplanar (A=180°) in a plane such as 70. In a stowed configuration indicated at 16A in FIG. 2 each group of panels lies in a stack such as 72 with adjacent panels at an angle B (shown in FIG. 3) of about 0°. In the stacked configuration the faces of the panels lie in substantially parallel planes.

FIG. 5 shows the panels in a partially deployed configuration. A mechanism 71 for controlling deployment includes several links 73a-73d that are pivotally coupled to one another at their ends, and that are pivotally connected at their centers to the panels. An actuator 74 on the boom pivots the innermost link 73a to control deployment of the panels.

The stowage of the panels in a stacked configuration is advantageous for a variety of reasons. One source of unreliability arises from the possibility of micrometeorite damage over an extended period of time. Most micrometeorites will penetrate through only a thin wall of a heat pipe 64. In the stowed configuration, only the outer panel 30 of each panel group is exposed to direct micrometeorite impact, so that the heat pipes of the rest of the group are protected. It may be noted that micrometeorites may sometimes penetrate through a wall of a heat pipe and a wall of an artery (which is protected by a heat pipe wall). Such artery damage can be dealt with in a number of ways, as by providing extra working fluid to make up for the small losses through holes in the arteries or providing redundant arteries throughout the radiator. In the stowed configuration, the arteries are protected from micrometeorite damage, the outer panels can also be reinforced to further increase reliability.

For a system wherein the working fluid operates at a temperature such as 1300° K., the working fluid may be a liquid metal such as lithium, which moves within a molybdenum (or other high temperature metal) alloy conduit. The melting point of lithium is about 180° C. (about 453° K.) which is far above the temperature of near absolute zero in outer space. During a long period before any high power operation of the space vehicle, the payload 12 would be expected to require only a very low amount of power which is a plurality of orders of magnitude less than the maximum power required during high power operation. The amount of power generated by the power source 14 required to maintain the payload 12 in its standby condition, would not generate sufficient heat to keep the radiator system 16 at a high enough temperature to maintain a lithium working fluid liquid, in the deployed configuration of the heat radiating system. The power source 14 would therefore have to operate at a moderate level to maintain the working fluid liquid. In the stowed configuration of FIG. 2, considerable heat is radiated only from the outermost panel 30. As a result, the power source 14 can operate at a much lower level in the stowed configuration, while still keeping the working fluid warm enough to maintain it in a liquid state required for rapid startup of the system when high power operation is required. Maintaining the parts of the radiation system warm also avoids embrittlement of material caused by very low temperatures and minimizes thermal shock during startup.

In the particular vehicle of FIG. 1, the power source 14 is a nuclear power source, and a shield 80 helps shield the payload 12 from the power source. Electric converters 82 are shown for converting some of the heat of the reactor to electricity; a variety of electricity generating systems can be used which convert a temperature difference to electricity.

The payload 12 is likely to include electronic devices that are sensitive to radiation and heat. To safeguard these devices from long term exposure to a moderate radiation level generated by the nuclear reactor 14, and to high temperatures during high power operation, the payload and nuclear reactor are separated by the long boom 28. Each group of panels is mounted on the boom, the innermost panel of each group being pivotally mounted through the flexible fluid joint 40 to the boom.

FIG. 6 illustrates a heat radiation system 90 which is stowed within a largely cylindrical shell 92 such as a launch vehicle. The figure shows two groups of panels 94, 96, each including six panels 101-106, although a different number can obviously be used. The panels are pivotally coupled in tandem through five joints 110, with the innermost panel 101 pivotally coupled to a boom 112. Those panels furthest from the axis 114 of the shell are of progressively smaller length, as measured between their opposite ends 116, 118. The outermost panel 106 furthest from the axis 114 is of smaller length than the innermost panel 101 closest to the axis 114. This arrangement enables a larger number of panels of greater length to be stored within a cylindrical shell. Also, the shell 92 serves to protect the panels from micrometeorite damage and also to keep the panels warm to keep the coolant liquid, with the power source operating at a minimal level. When deployment of the panels is required, the shell 92 can be pivoted open about pivot joints at 120 and 122 at each side, by releasing a releasable joint at 124. In the deployed configuration a group of panels such as 96 are in the configuration shown at 96A wherein some if not all of the panels such as 101A, 102A and 103A lie substantially coplanar.

Thus, the invention provides an outer space vehicle with a pulse power radiator system for use less than half of the time, which facilitates reliable operation of the system. The radiator system can include a plurality of radiator panels that each have arteries for carrying a hot fluid whose heat is distributed over a large area radiator surface, and a means for moving the panels between a deployed configuration wherein at least a plurality of panels lies substantially coplanar to radiate heat, and a stowed configuration wherein they lie in a stack. In the stack configuration, most of the radiation system is protected from micrometeorites and less heat is radiated to help keep the working fluid in a liquid state. The panels are preferably joined in tandem by pivot joints that both mechanically and fluidly couple the arteries of adjacent panels. Groups of panels can be mounted on an elongated boom whose opposite ends hold the payload and power source, to keep the payload and power source separated to isolate the payload from nuclear radiation as well as the large source of heat of the power source. Long panels can be stored within a largely cylindrical shell by forming the innermost panel lying closest to the axis of the shell so it is longer than the outermost panel lying furthest from the axis. The vehicle is preferably operated so that the power source supplies sufficient heat when the radiator panels are in their stowed position, to maintain the working fluid liquid.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for radiating heat from a heat-generating power source on an orbiting outer space vehicle, wherein the power source is established in a very active state to generate considerable heat only a fraction of the time the vehicle is in orbit, and a minimally active state to generate much less heat part of the time the vehicle is in orbit, comprising:

maintaining said vehicle in orbit with said power source in said minimally active state, and then establishing said power source in said very active state;

establishing a plurality of radiator panels that are each coupled to said power source to receive heat therefrom and that each has a length and ends spaced by said length, with pairs of said panels being pivotally connected at their ends;

maintaining said plurality of panels in a stowed configuration when said power source is in said minimally active state, wherein in said stowed configuration said panels are angled about 0° at said joints and said panels lie in substantially parallel planes and adjacent to one another in a stack, and establishing said plurality of panels in a deployed configuration substantially only when said power source is in said very active state, wherein in said deployed configuration said panels are angled at least about 90° at said joints.

2. A pulse power space radiator system for use on an outer space vehicle to radiate heat, comprising:

a plurality of radiator panels, each having arteries for carrying a hot fluid and means forming a radiator surface thermally coupled to said arteries for receiving heat therefrom and radiating it;

means for moving said panels between a deployed configuration wherein they lie substantially coplanar to radiate heat, and a stowed configuration wherein they lie in a stack;

a power generator which creates heat, and a payload which can operate reliably only if heating thereof is avoided; and a boom connecting said power generator and payload, said plurality of panels including at least one panel mounted on said boom and occupying a space lying substantially between said generator and payload.

3. A thermal space radiator for use on an outer space vehicle to radiate heat, comprising:

a largely cylindrical transport shell having an axis;

first and second groups of radiator panels lying in said shell, each panel including arteries for carrying a hot fluid and means forming a radiator surface thermally coupled to said arteries for receiving heat therefrom and radiating it, each panel having a length and first and second ends spaced by its length, and each group including at least first, second and third panels;

means for pivotally connecting the ends of pairs of said panels to connect the panels in each group in tandem, said means for pivotally connecting forming fluid joints connecting the arteries of pairs of connected panels;

said panels lying in said shell in a stowed configuration wherein each of said panels of a group lies in substantially parallel planes, with said first panel of each group lying nearest said axis and subsequent panels of the group lying progressively further from said axis, and each group lies primarily on a different side of said axis;

each of said groups of panels includes panels of different lengths, with the panel furthest from said axis being of smaller length than the panel closest to said axis; and means for moving said shell relative to said group of panels to enable said panels to be moved to their deployed position.

4. A method for radiating heat from a heat-generating power source on an outer space vehicle, wherein the power source is very active to generate considerable heat only a fraction of the time, and minimally active to generate much less heat part of the time, comprising:

establishing a plurality of radiator panels that are each coupled to said power source to receive heat therefrom and that each has a length and ends spaced by said length, with pairs of said panels being pivotally connected at their ends;

maintaining said plurality of panels in a stowed configuration when said power source is minimally active, wherein in said stowed configuration said panels are angled about 0° at said joints and said panels lie in substantially parallel planes and adjacent to one another in a stack, and establishing said plurality of panels in a deployed configuration when said power source is very active, wherein in said deployed configuration said panels are angled at least about 90° at said joints;

passing a working fluid from said power source and through said panels, and cooling said fluid by radiation from said panels;

operating said power source when it is minimally active and said panels are in a stowed configuration, at a level to generate sufficient heat to maintain said working fluid above its solidifying temperature in said stowed panels.

* * * * *